United States Patent
Iwama et al.

(10) Patent No.: US 11,344,924 B2
(45) Date of Patent: May 31, 2022

(54) WASHING APPARATUS AND WASHING METHOD

(71) Applicant: JVCKENWOOD Corporation, Yokohama (JP)

(72) Inventors: Shigehiko Iwama, Yokohama (JP); Yuichi Hasegawa, Yokohama (JP); Katsue Horikoshi, Yokohama (JP); Masayuki Ono, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 1 day.

(21) Appl. No.: 16/777,164

(22) Filed: Jan. 30, 2020

(65) Prior Publication Data

US 2020/0246843 A1    Aug. 6, 2020

(30) Foreign Application Priority Data

Jan. 31, 2019   (JP) .............................. JP2019-015512

(51) Int. Cl.
*B08B 3/04*    (2006.01)
*B08B 13/00*   (2006.01)

(52) U.S. Cl.
CPC .............. *B08B 3/044* (2013.01); *B08B 13/00* (2013.01)

(58) Field of Classification Search
CPC .............. B01L 13/02; B01L 2200/0615; B01L 2200/141; B01L 2300/0803; B01L 3/5085; B08B 13/00; B08B 3/02; B08B 3/044; B08B 9/00; B08B 9/093; B08B 9/0933; G01N 2035/0437; G01N 35/04
See application file for complete search history.

(56) References Cited

U.S. PATENT DOCUMENTS

| | | | | |
|---|---|---|---|---|
| 5,037,612 | A * | 8/1991 | Takahashi | G01N 35/025 422/64 |
| 6,112,603 | A * | 9/2000 | Pietila | B01L 3/0203 73/863.23 |
| 8,916,113 | B2 * | 12/2014 | Yamakawa | G01N 33/50 422/510 |

FOREIGN PATENT DOCUMENTS

| | | |
|---|---|---|
| JP | 2015-127691 A | 7/2015 |
| WO | 01/00324 A1 | 1/2001 |

OTHER PUBLICATIONS

Extended Search Report dated Jun. 24, 2020 issued in corresponding European Application No. 20154695.9.

* cited by examiner

*Primary Examiner* — Douglas Lee
(74) *Attorney, Agent, or Firm* — Nath, Goldberg & Meyer; Jerald L. Meyer

(57) ABSTRACT

A washing apparatus includes a stage, a suction nozzle, and a control unit. On the stage, an analytical unit is mounted. In the analytical unit, a well having a hole shape including a bottom surface and an inner peripheral surface is formed. The suction nozzle sucks a solution in the well. The control unit, after controlling the suction nozzle to sucks the solution in the well, controls the stage to rotate the stage on which the analytical unit is mounted at a predetermined speed of rotation, and controls the suction nozzle to suck a residue of the solution existing in the well.

5 Claims, 10 Drawing Sheets

WASHING APPARATUS AND WASHING METHOD

CROSS REFERENCE TO RELATED APPLICATION

This application is based upon and claims the benefit of priority under 35 U.S.C. § 119 from Japanese Patent Application No. 2019-015512 filed on Jan. 31, 2019, the entire contents of which are incorporated herein by reference.

BACKGROUND

The present disclosure relates to a washing apparatus and a washing method.

There has been known an immunoassay for quantitatively analyzing discovery of diseases, effects of medical treatments, and the like by detecting as a biomarker a specific antigen or antibody associated with a disease. Japanese Unexamined Patent Application Publication No. 2015-127691 discloses an analytical method including fixing an antibody on an analytical substrate using an analytical unit having a plurality of wells, specifically binding a substance to be detected to the antibody, specifically binding fine particles to the substance to be detected, and counting the fine particles, thereby quantifying the substance to be detected.

By injecting in the wells a buffer solution including an antibody to be incubated, the antibody can be fixed on the analytical substrate. The buffer solution including the antibody is sucked by a suction nozzle, and the insides of the wells are further washed with a cleaning solution. After sucking the cleaning solution by a suction nozzle and drying the insides of the wells, a sample solution including the substance to be detected is injected into the wells to be incubated. Consequently, the substance to be detected and the antibody can be specifically bind to each other.

The sample solution including the substance to be detected is sucked with the suction nozzle, and the insides of the wells are further washed with the cleaning solution. After sucking the cleaning solution with the suction nozzle and drying the insides of the wells, the buffer solution including the fine particles is injected to be incubated. Consequently, the fine particles and the substance to be detected can be specifically bound to each other.

The buffer solution including the fine particles is sucked with the suction nozzle, and the insides of the wells are further washed with the cleaning solution. The cleaning solution is sucked with the suction nozzle and the insides of the wells are dried. According to the above-mentioned process, an analytical substrate in which the substance to be detected is captured by being sandwiched between the fine particles and the antibody can be produced.

SUMMARY

After washing the wells, a cleaning solution which is failed to be sucked may exist as a residue (not-sucked residue). Such a residue is easy to occur at or near a boundary portion between a bottom surface and an inner peripheral surface of the well. If such a residue occurs, the time for drying the inside of the well becomes long, and that becomes a factor in deteriorating working efficiency. In the case of the buffer solution or the sample solution, residues may occur in the same manner as the cleaning solution. The cleaning solution, the buffer solution, and the sample solution used herein are collectively referred to as a solution.

A first aspect of one or more embodiments provides a washing apparatus including: a stage on which an analytical unit, in which a well is formed, is mounted, the well having a hole shape including a bottom surface and an inner peripheral surface; a suction nozzle configured to suck a solution in the well; and a control unit configured to control an operation of the suction nozzle and an operation of the stage, wherein the control unit, after controlling the suction nozzle to sucks the solution in the well, controls the stage to rotate the stage on which the analytical unit is mounted at a predetermined speed of rotation, and controls the suction nozzle to suck a residue of the solution existing in the well.

A second aspect of one or more embodiments provides a washing method including: sucking, with a suction nozzle controlled by a control unit, a solution in a well formed in an analytical unit, the well having a hole shape including a bottom surface and an inner peripheral surface; rotating, by the control unit at a predetermined speed of rotation, a stage on which the analytical unit, from which the solution has been sucked with the suction nozzle, is mounted; and sucking, with the suction nozzle controlled by the control unit, a residue of the solution existing in the well.

BRIEF DESCRIPTION OF THE DRAWINGS

FIG. 24 is a cross-sectional diagram of the analytical unit taken in the line A-A of FIG. 1.

DETAILED DESCRIPTION

[Analytical Unit]

Figure 1:
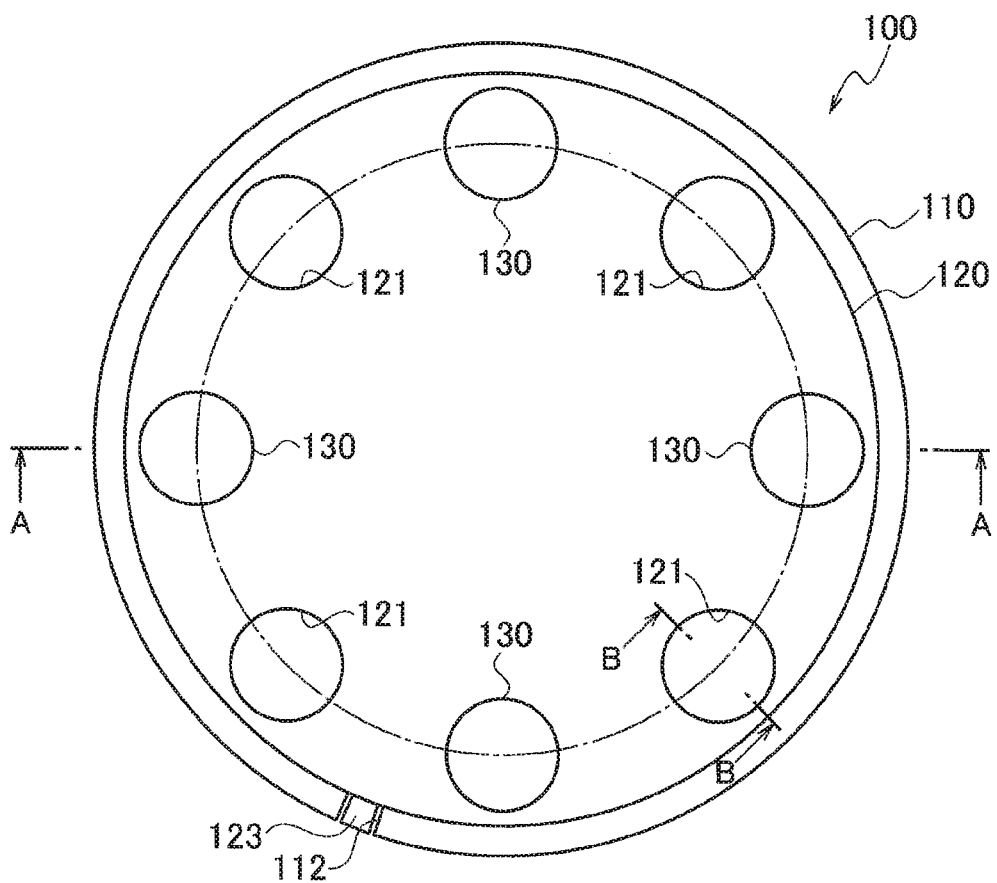
FIG. 1 is a top view diagram illustrating a configuration example of an analytical unit according to one embodiment.
Figure 2A:
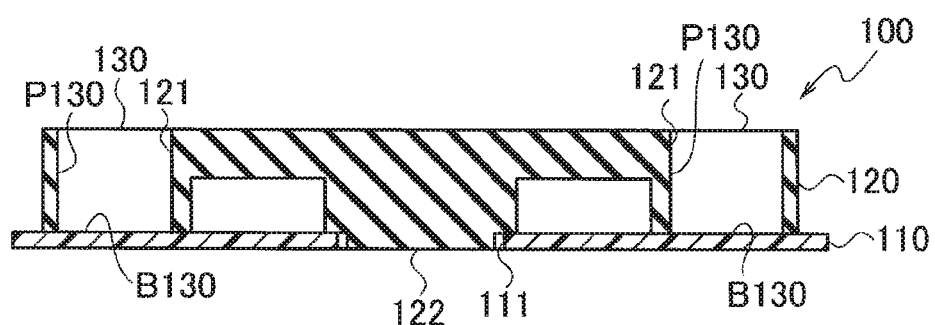
FIG. 2B is a cross-sectional diagram illustrating a state where a cartridge is removed from an analytical substrate.
Figure 2B:
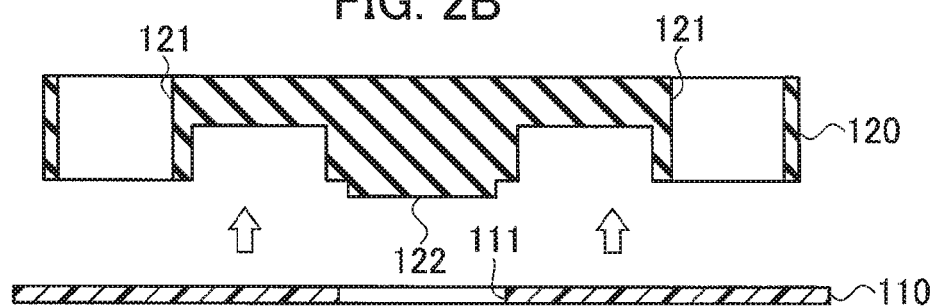

An analytical unit according to one embodiment will now be explained with reference to FIGS. 1, 2A, and 29. FIG. 1 illustrates a state where the analytical unit according to one embodiment is observed from a cartridge side. FIG. 2A illustrates a cross section of the analytical unit taken in the line A-A of FIG. 1. FIG. 2B illustrated a state where a cartridge is removed from an analytical substrate.

As illustrated in FIG. 1, an analytical unit 100 includes an analytical substrate 110 and a cartridge 120. The analytical substrate 110 has a disc shape equivalent to optical discs, such as a Blu-ray Disc (BD), DVD, or a compact disc (CD), for example.

The analytical substrate 110 is formed of a resin material(s) generally used for an optical disc, for example, such as a polycarbonate resin or a cycloolefin polymer. Note that the analytical substrate 110 is not limited to the above-mentioned optical disc, and an optical disc in conformity with another form or a predetermined standard can also be used therefor.

As illustrated in FIG. 1, 2A, or 2B, the analytical substrate 110 includes a center hole 111 and a notch 112. The center hole 111 is formed at a center portion of the analytical substrate 110. The notch 112 is formed at an outer peripheral portion of the analytical substrate 110. The notch 112 is a reference position identifying unit for identifying a reference position in a rotative direction of the analytical substrate 110.

As illustrated in FIG. 2A, the analytical unit 100 includes a plurality of wells 130, each formed of a through hole 121 of the cartridge 120 and a surface of the analytical substrate 110. The well 130 has a hole shape composed by a bottom surface 9130, an inner peripheral surface P130, and an aperture A130. The surface of the analytical substrate 110 composes the bottom surface 9130 of each well 130. The inner peripheral surface which is an inner surface of each through hole 121 composes the inner peripheral surface P130 of each well 130.

The aperture A130 is formed in a surface at an opposite side to the bottom surface B130 in the cartridge 120. The well 130 is a container for storing solutions, such as a sample solution, a buffer solution, and a cleaning solution. Note that although eight wells 130 are illustrated in FIG. 1 as an example, the number of the wells 130 is not limited thereto.

As illustrated in FIG. 2B, the cartridge 120 can be separated from the analytical substrate 110. Detection and measurement of fine particles which label substance to be detected are performed by the analytical substrate 110 standalone from which the cartridge 120 has been separated.

[Washing Apparatus]

Figure 3:
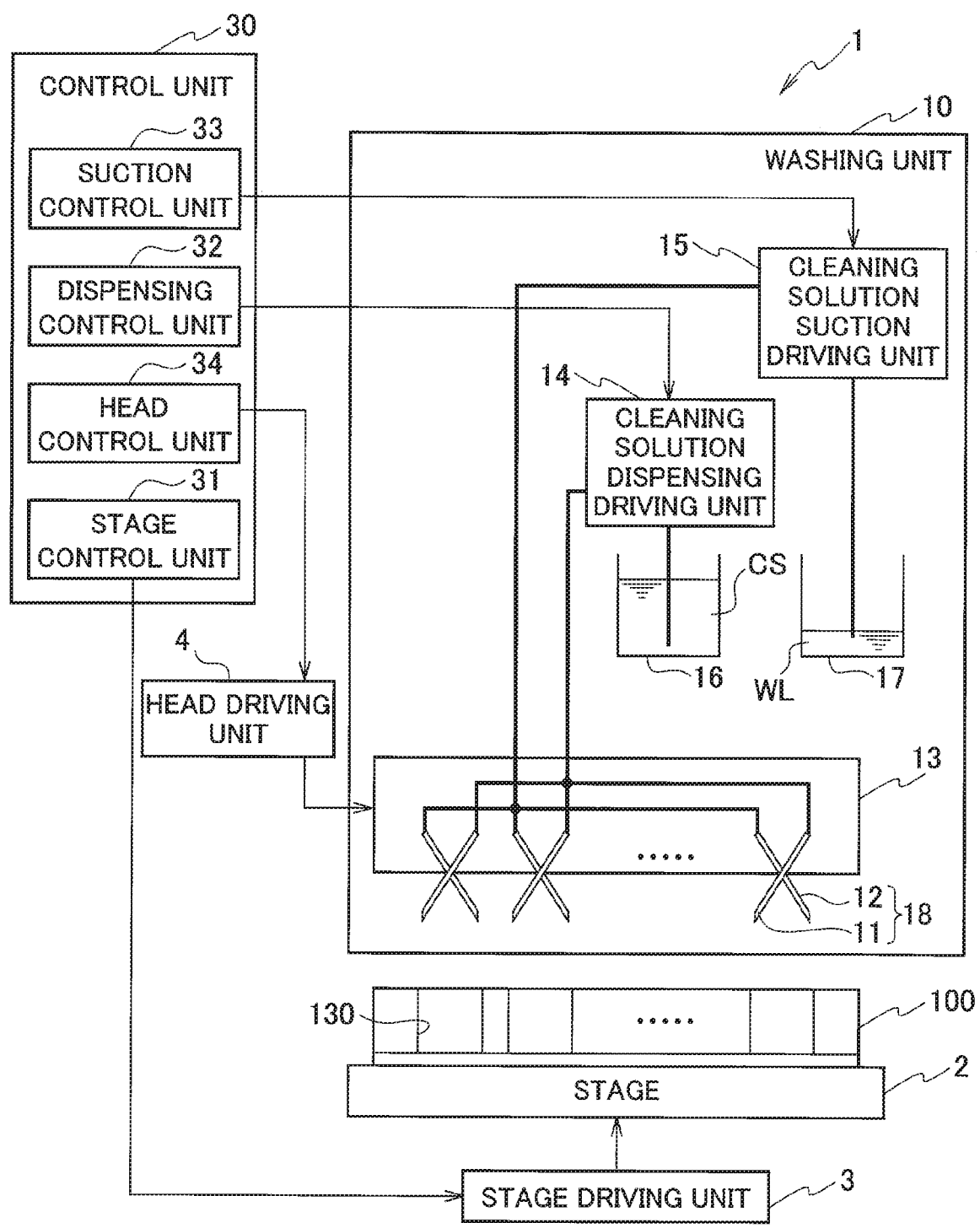
FIG. 3 is a configuration diagram illustrating an example of a washing apparatus according to one embodiment.

A washing apparatus according to one embodiment will now be explained with reference to FIG. 3. FIG. 3 illustrates a configuration example of a washing apparatus 1 according to one embodiment. The washing apparatus 1 includes a stage 2, a stage driving unit 3, a washing unit 10, and a control unit 30. The washing unit 10 includes a dispensing nozzle 11, a suction nozzle 12, a nozzle head 13, a cleaning solution dispensing driving unit 14, a cleaning solution suction driving unit 15, a cleaning solution container 16, and a waste liquid container 17.

The dispensing nozzle 11 and the suction nozzle 12 are fixed to the nozzle head 13. The dispensing nozzle 11 and the suction nozzle 12 compose one nozzle unit 18. In other words, the number of the dispensing nozzle 11 and the number of the suction nozzles 12 is the same. As illustrated in FIG. 1, when the analytical unit 100 has eight wells 130, eight nozzle units 18 respectively corresponding to the wells 130 are fixed to the nozzle head 13.

The control unit 30 includes a stage control unit 31, a dispensing control unit 32, and a suction control unit 33. As the control unit 30, computer equipment or a central processing unit (CPU) may be used. The analytical unit 100 is mounted on the stage 2 so that each well 130 and each nozzle unit 18 are positioned at each other. The stage control unit 31 can control the stage driving unit 3 to move the stage 2 closer to or away from the nozzle head 13. The stage control unit 31 can control the stage driving unit 3 to rotate the stage 2.

The stage control unit 31 can control the stage driving unit 3 to move the analytical unit 100 closer to or away from the nozzle head 13, or to rotate the nozzle head 13, in a state where the analytical unit 100 is mounted on the stage 2.

The washing apparatus 1 may include a head driving unit 4, and the control unit 30 may include a head control unit 34. The head control unit 34 can control the head driving unit 4 to move the nozzle head 13 closer to or away from the stage 2. In this case, the stage control unit 31 controls the stage driving unit 3 to rotate the stage 2 and the analytical unit 100 mounted on the stage 2.

The cleaning solution container 16 is a container for storing a cleaning solution CS. Pure water may be used as the cleaning solution CS. The dispensing control unit 32 controls the cleaning solution dispensing driving unit 14 to supply cleaning solution CS currently stored in the cleaning solution container 16 to the nozzle head 13. In a state where the analytical unit 100 and the nozzle head 13 are close to each other, the cleaning solution CS is dispensed into the well 130 from the dispensing nozzle 11.

The suction control unit 33 controls the cleaning solution suction driving unit 15 to suck the cleaning solution CS in the well 130 with the suction nozzle 12. The cleaning solution CS sucked from the well 130 is stored in the waste liquid container 17. In other words, the waste liquid container 17 is a container for storing a waste liquid WL. A pump may be used as the cleaning solution dispensing driving unit 14 and the cleaning solution suction driving unit 15.

Figure 4:
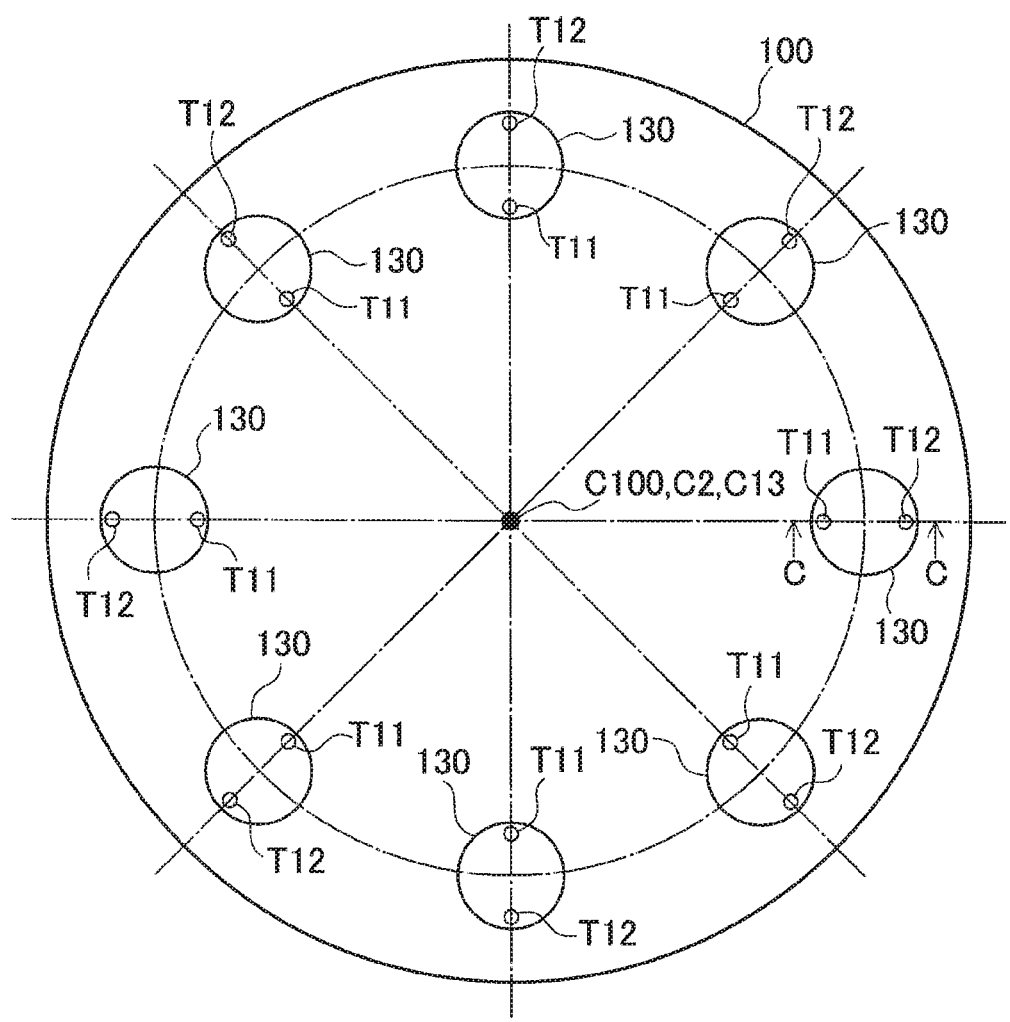
FIG. 4 is a top view diagram illustrating an example of a positional relationship between wells and dispensing nozzles and suction nozzles in the analytical unit.

As illustrated in FIG. 4, the centers of each of the plurality of the wells 130 are disposed at equal intervals on the same circumference with respect to the center C100 of the analytical unit 100. The center C100 of the analytical unit 100, the rotation center C2 of the stage 2, and the center C13 of the nozzle head 13 are matched with one another. In a radial direction of the Analytical unit 100, the dispensing nozzle 11 is disposed so that a tip T11 thereof is positioned at the center C100 side of the analytical unit 100. The suction nozzle 12 is disposed so that a tip T12 thereof is positioned at an outer peripheral side observed from the rotation center of the analytical unit 100.

An example of a washing method of the wells 130 will now be explained with reference to a flow chart illustrated in FIG. 5, and FIGS. 6 to 12. The analytical unit 100 is mounted on the stage 2. The cleaning solution CS is stored in the cleaning solution container 16. The description in parentheses illustrates a case where the head control unit 34 controls the head driving unit 4 to move the nozzle head 13 closer to or away from the stage 2.

Figure 5:
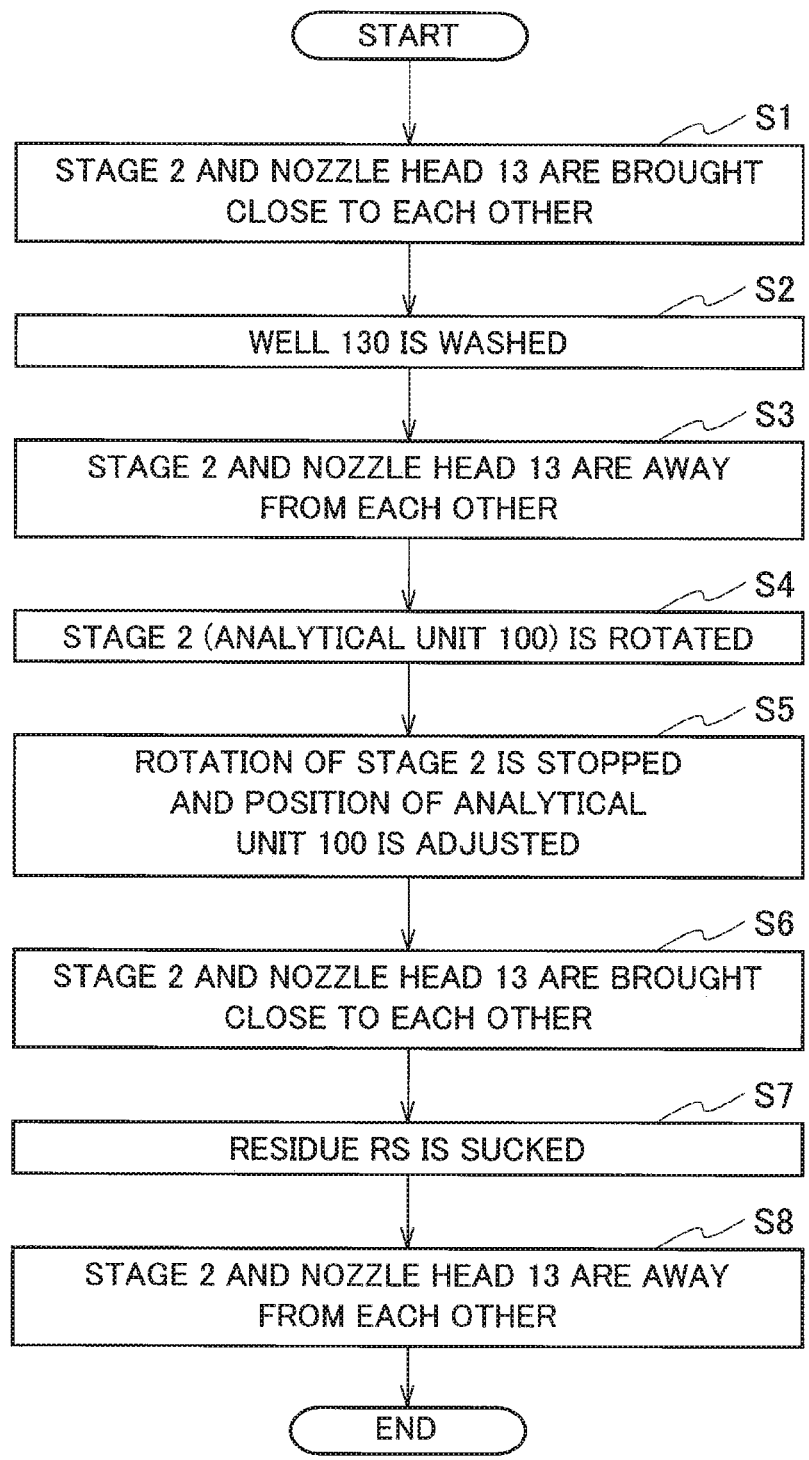
FIG. 5 is a flow chart illustrating an example of a washing method according to one embodiment.
Figure 6:
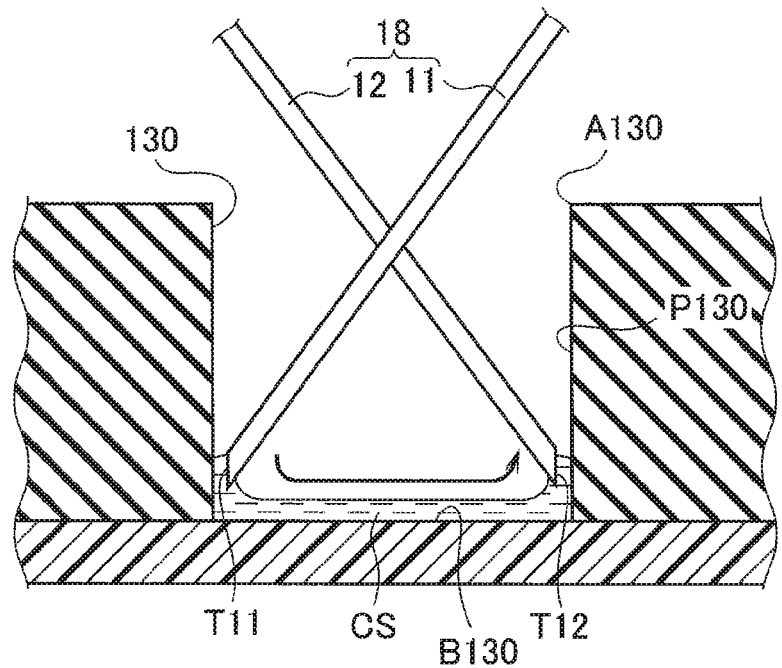
FIG. 6 is a diagram illustrating an example of a state where a well is washed by dispensing a cleaning solution from a dispensing nozzle and sucking the cleaning solution with a suction nozzle.

In FIG. 5, the stage control unit 31 (head control unit 34) controls the stage driving unit 3 (head driving unit 4) to move the stage 2 (nozzle head 13) closer to the nozzle head 13 (stage 2), in Step S1. FIG. 6 schematically illustrates a cross section of the well 130 taken in the line C-C of FIG. 4. FIG. 6 illustrates a state where the stage 2 and the nozzle head 13 are close to each other. The stage 2 and the nozzle head 13 are close to each other, and thereby the nozzle unit 18 is inserted into the well 130 through the aperture A130.

In the state where the stage 2 and the nozzle head 13 are close to each other, the tip T12 of the suction nozzle 12 is positioned close to the bottom surface B130 of the well 130, and is also positioned at the outer peripheral side of the analytical unit 100 in the inner peripheral surface P130 of the well 130. In the state where the stage 2 and the nozzle head 13 are close to each other, the tip T11 of the dispensing nozzle 11 is positioned at the center C100 side of the analytical unit 100 in the inner peripheral surface P130 of the well 130.

In FIGS. 3 and 6, the tip T11 of the dispensing nozzle 11 and the tip T12 of the suction nozzle 12 have the same height with respect to the bottom surface B130 of the well 130. The tip T11 of the dispensing nozzle 11 is preferably disposed at a position higher than that of the tip T12 of the suction nozzle 12 with respect to the bottom surface B130 of the well 130. By setting the position of the tip T11 of the dispensing nozzle 11 higher, it can prevent or reduce that the cleaning solution CS (waste liquid WL) which has become dirty by washing the well 130 adheres to the tip T11 of the dispensing nozzle 11.

In Step S2, the dispensing control unit 32 controls the cleaning solution dispensing driving unit 14 to dispense the cleaning solution CS currently stored in the cleaning solution container 16 into the well 130 from the dispensing nozzle 11. The suction control unit 33 controls the cleaning solution suction driving unit 15 to suck the cleaning solution CS in the well 130 with the suction nozzle 12. Consequently, the well 130 is washed with the cleaning solution CS.

In the washing of the well 130, the dispensing control unit 32 and the suction control unit 33 may perform the washing process of sucking the cleaning solution CS with the suction nozzle 12 for a predetermined time, while the cleaning solution CS is dispensed from the dispensing nozzle 11, or may perform a predetermined number of times the washing process of sucking the cleaning solution CS stored in the well 130 with suction nozzle 12 after dispensing the cleaning solution CS from the dispensing nozzle 11. Alternatively, these washing processes may be combined. The dispensing control unit 32 and the suction control unit 33 may repeat a predetermined number of the washing processes in Step S2.

After the washing of the well 130 is completed, the dispensing control unit 32 and the suction control unit 33 control the cleaning solution dispensing driving unit 14 and the cleaning solution suction driving unit 15 to stop the suction of the cleaning solution CS after stopping the dispensing of the cleaning solution CS.

Figure 7:
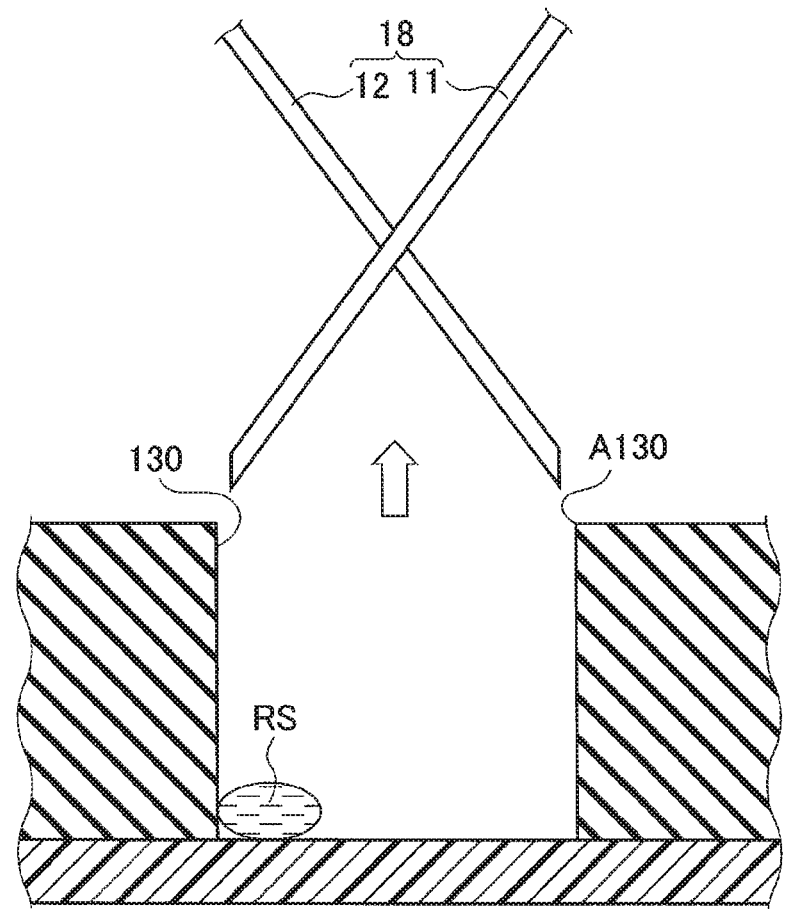
FIG. 7 is a diagram illustrating an example in a state where a residue (not-sucked residue) of the cleaning solution occurring in the well.

In Step S3, the stage control unit 31 (head control unit 34) controls the stage driving unit 3 (head driving unit 4) to move the stage 2 (nozzle head 13) away from the nozzle head 13 (stage 2). FIG. 7 illustrates a state where the stage 2 and the nozzle head 13 are away from each other. The stage 2 and the nozzle head 13 are away from each other, and thereby the nozzle unit 18 is moved to an upper side of the well 130 from the aperture A130.

Figure 8:
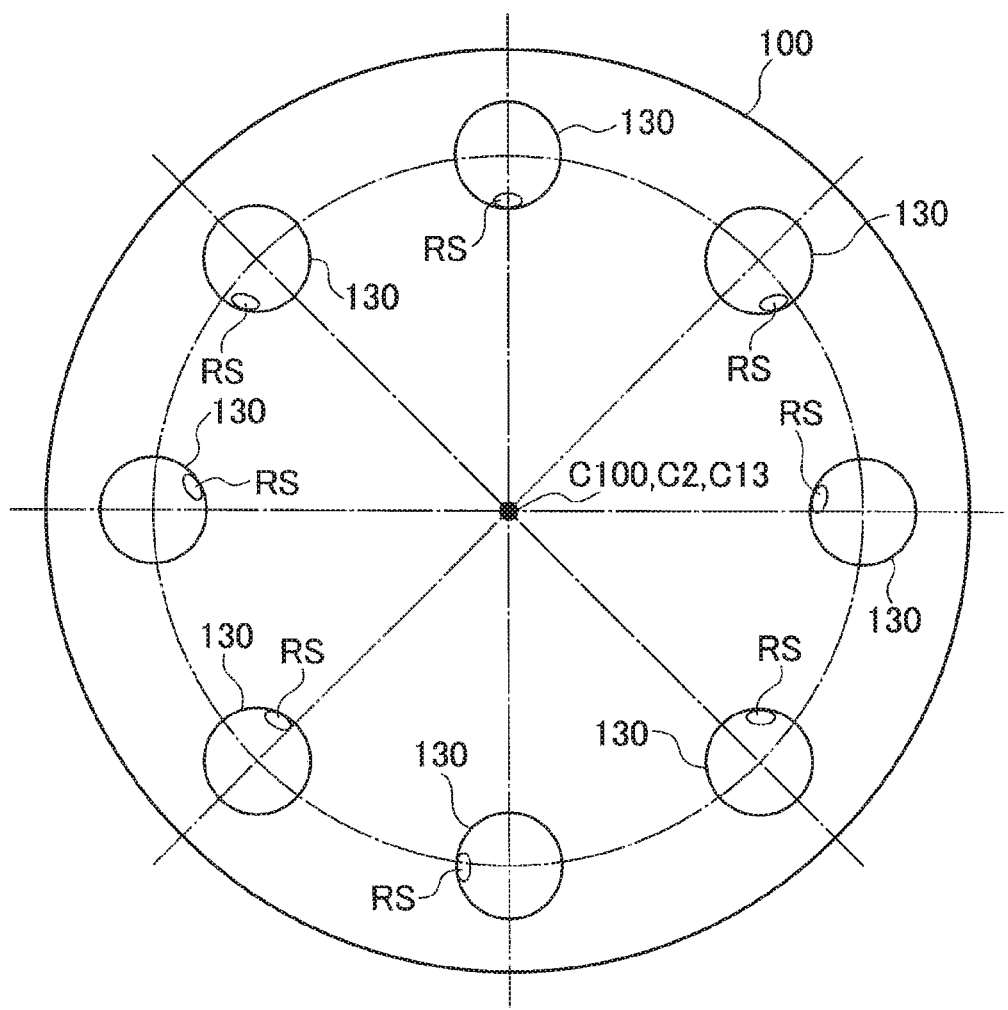
FIG. 8 is a top view diagram illustrating an example in a state where residues of the cleaning solution respectively occurring in the wells.

As illustrated in FIG. 8, after sucking the cleaning solution CS stored in the well 130 with the suction nozzle 12 (after the washing) in Step S2, a residue RS (not-sucked residue) of the cleaning solution CS referred as a liquid ball may occur in the well 130. Since the time for drying the inside of the well 130 becomes long if the residue RS exists in the well 130, it becomes a factor in deteriorating working efficiency. In general, the residue RS easily occurs at a boundary portion between the bottom surface B130 and the inner peripheral surface P130 of the well 130, and irregularly occurs in a peripheral direction of the inner peripheral surface P130.

Figure 9:
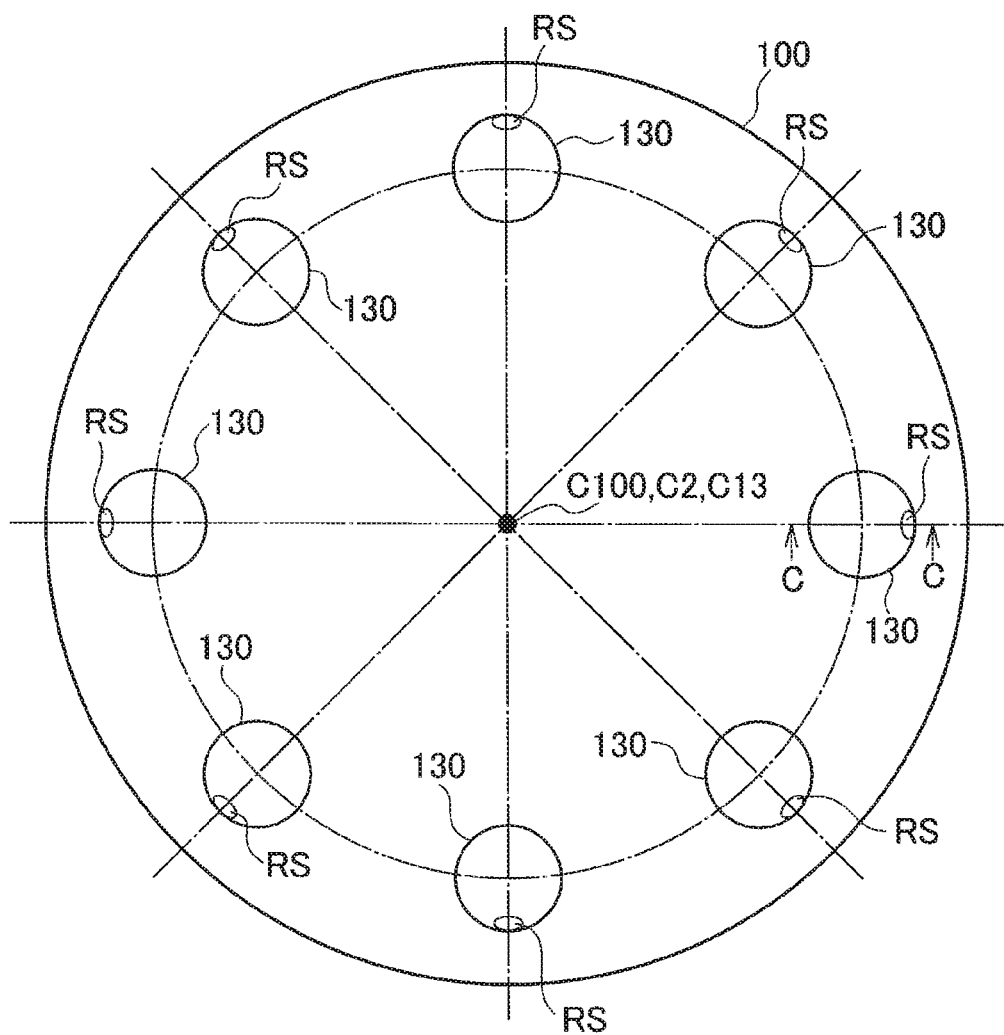
FIG. 9 is a top view diagram illustrating an example of a state of the residues in the wells after a stage on which the analytical unit is mounted is rotated.
Figure 10:
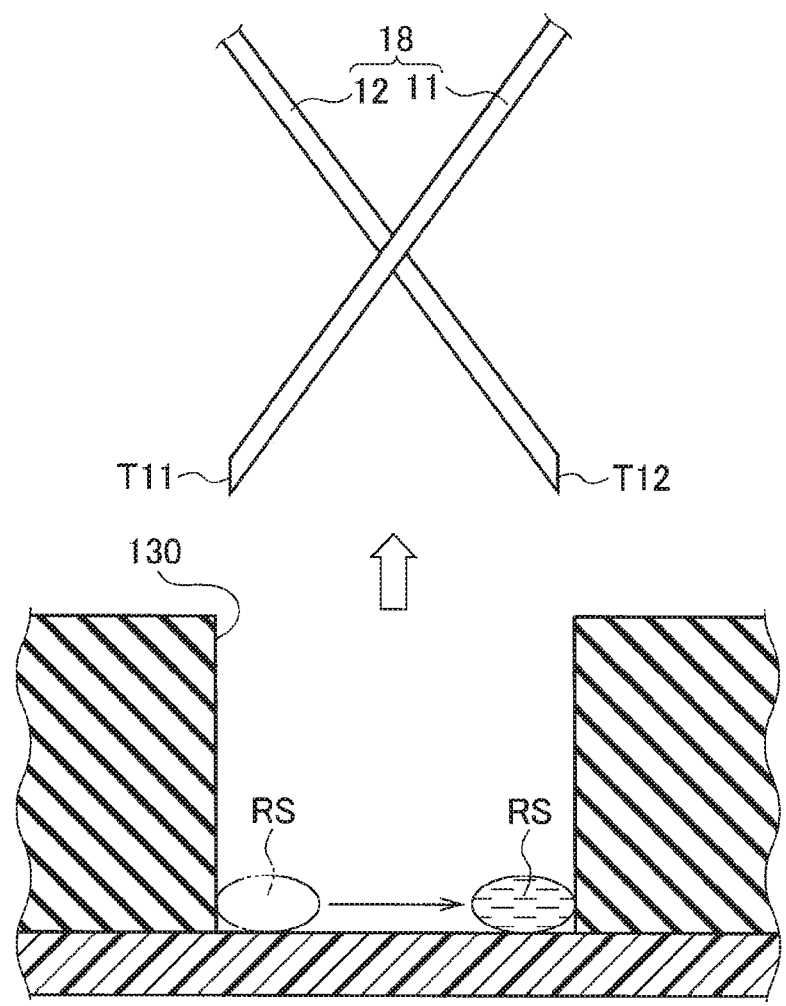
FIG. 10 is a diagram illustrating an example of a state of the residue in the well after the stage on which the analytical unit is mounted is rotated.

In Step S4, the stage control unit 31 controls the stage driving unit 3 to rotate the stage 2 at a predetermined speed of rotation in a state where the analytical unit 100 is mounted thereon. As illustrated in FIG. 9 or 10, the stage 2 is rotated, and thereby the residue RS is moved to the outer peripheral side of the analytical unit 100 in the well 130 by a centrifugal force.

Specifically, when the stage 2 is rotated in the state where the analytical unit 100 is mounted thereon and the centrifugal force depending on the speed of rotation exceeds a frictional force between the bottom surface of the well 130 and the residue RS, the residue RS is moved to the outer peripheral side of the analytical unit 100 in the well 130. In other words, it can be said that the residue RS is moved more easily as the speed of rotation is higher. Accordingly, the predetermined speed of rotation is a speed of rotation equal to or greater than a speed at which the residue RS begins to move when the stage 2 is rotated. The stage control unit 31 rotates the stage 2 at the predetermined speed of rotation, and thereby the residue RS is moved to a position corresponding to the tip T12 of the suction nozzle 12.

After rotating the stage 2 for a predetermined time period, the stage control unit 31 stops the rotational operation, and adjusts a relative position between each well 130 and each nozzle head 13 to a position before starting the rotational operation, in Step S5.

In Step S6, the stage control unit 31 (head control unit 34) controls the stage driving unit 3 (head driving unit 4) to move the stage 2 (nozzle head 13) closer to the nozzle head 13 (stage 2). In Step S7, the suction control unit 33 controls the cleaning solution suction driving unit 15 to suck the residue RS stored in the well 130 with the suction nozzle 12.

The suction with the suction nozzle 12 may be started after moving the stage 2 (nozzle head 13) closer to the nozzle head 13 (stage 2), the stage 2 (nozzle head 13) may be moved so as to be closer to the nozzle head 13 (stage after the suction with the suction nozzle 12 is started, or the moving of the stage 2 (nozzle head 13) and the suction with the suction nozzle 12 may be simultaneously started.

Figure 11:
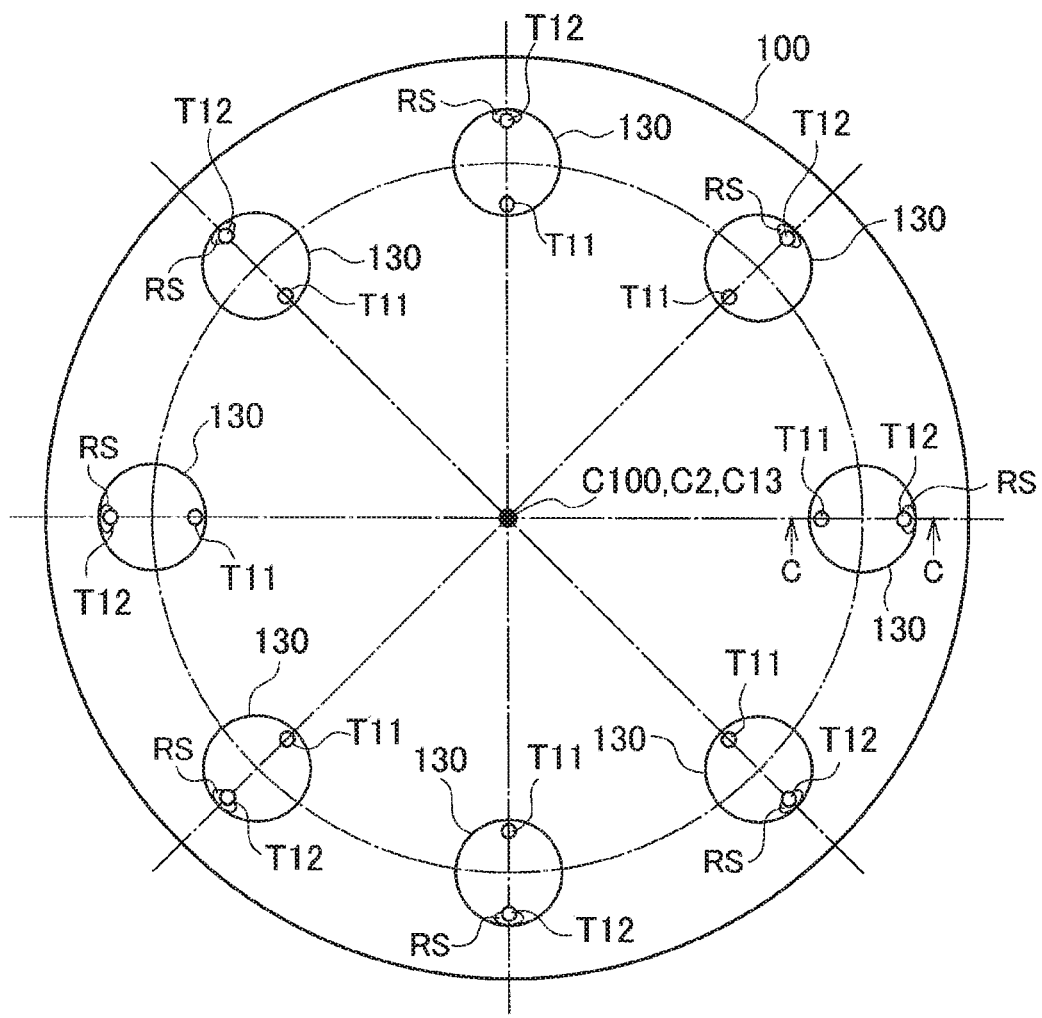
FIG. 11 is a top view diagram illustrating an example of a positional relationship between the residues and the suction nozzles.
Figure 12:
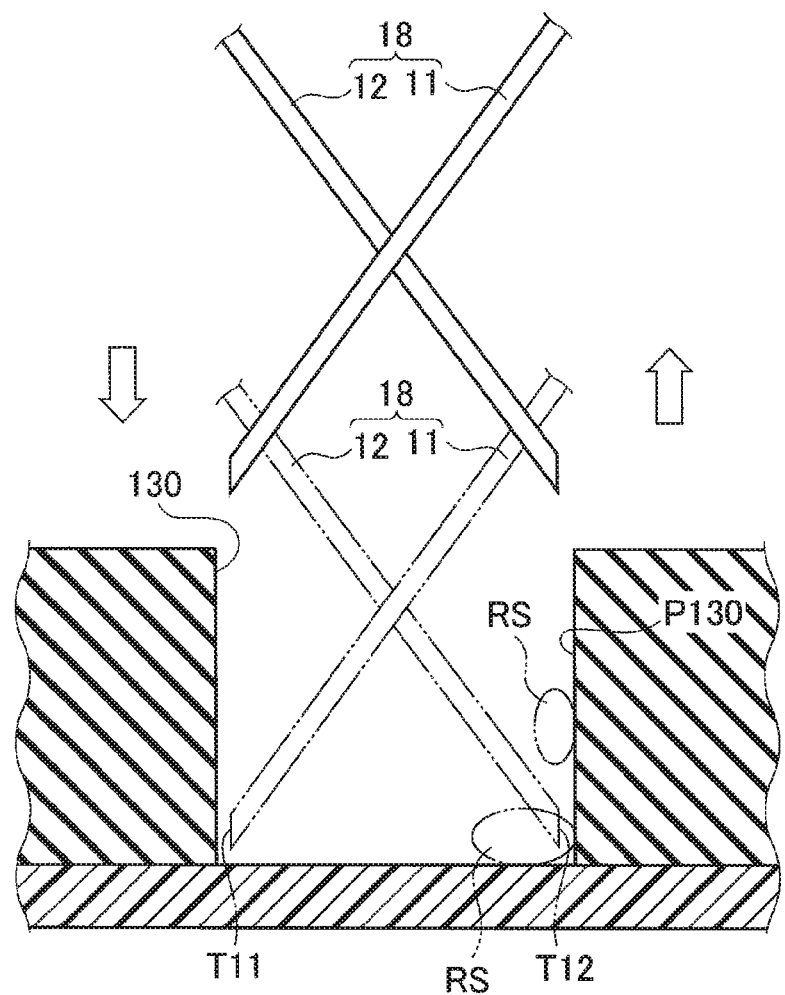
FIG. 12 is a diagram illustrating an example in a state where the suction nozzle sucks the residue.

As illustrated in FIG. 11 or 12, since the residue RS is moved to the position corresponding to the tip T12 of suction nozzle 12 in Step S4, the washing apparatus 1 can efficiently suck the residue RS with the suction nozzle L. In Step S8, the stage control unit 31 (head control unit 34) controls the stage driving unit 3 (head driving unit 4) to move the stage 2 (nozzle head 13) away from the nozzle head 13 (stage 2).

The stage 2 (nozzle head 13) may be moved away from the nozzle head 13 (stage 2), in a state where the suction with the suction nozzle 12 is kept. When the residue RS is adhered to the inner peripheral surface P130 of the well 130, the residue RS adhered to the inner peripheral surface P130 of the well 130 can be sucked with the suction nozzle 12 by moving the stage 2 (nozzle head 13) away from the nozzle head 13 (stage 2), in the state where the suction with the suction nozzle 12 is kept. After the stage 2 or the nozzle head 13 is moved to a predetermined position, the washing apparatus 1 terminates the washing process.

According to the washing apparatus 1 and the washing method according to one or more embodiments, the residue RS existing in the well 130 can be moved to the position corresponding to the tip T12 of the suction nozzle 12 by rotating the stage 2 in the state where the analytical unit 100 is mounted thereon, after washing the well 130. Therefore, the residue RS can be efficiently sucked with the suction nozzle 12. Consequently, according to the washing apparatus 1 and the washing method of one or more embodiments, the residue RS of the cleaning solution CS existing in the well 130 which occurs after washing the well 130 can efficiently be removed.

The present invention is not limited to the configuration of the above-described one or more embodiments, and various modifications can be made without departing from the scope of the invention.

In one or more embodiments, the nozzle unit 18 has a configuration in which the dispensing nozzle 11 and the suction nozzle 12 intersect one another. The nozzle unit 18 may be disposed so that tip T12 of the suction nozzle 12 is positioned at the outer peripheral side of the analytical unit 100.

In one or more embodiments, the end face of the tip T11 of the dispensing nozzle 11 and the end face of the tip T12 of the suction nozzle 12 are formed so as to be opposite to the inner peripheral surface P130 of the well 130. The tip T11 of the dispensing nozzle 11 and the tip T12 of the suction nozzle 12 may be positioned near the boundary portion between the inner peripheral surface P130 and the bottom surface B130 of the well 130. For example, the end face of the tip T11 of the dispensing nozzle 11 and the end face of the tip T12 of the suction nozzle 12 may be formed so as to be opposite to the bottom surface B130 of the well 130. The shapes of the tip T11 of dispensing nozzle 11 and the tip T12 of the suction nozzle 12 ate not particularly limited.

In one or more embodiments, the operation is performed in the order of rotating only the stage 2 without rotating the nozzle head 13 and sucking the residue RS after stopping the rotation, but the residue RS may be sucked while simultaneously rotating the nozzle head 13 and the stage 2. In this case, the rotation stop operation before the suction can be omitted.

Although one or more embodiments have explained the suction of the cleaning solution, the present invention can also be applied to suctions of buffer solutions including antibodies or fine particles and sample solutions including or having a possibility of including substances to be detected.

According to the washing apparatus and washing method according to one or more embodiments, residues of solutions in the wells can be efficiently removed.

What is claimed is:

1. A washing apparatus comprising:
   a stage on which an analytical unit, in which a well is formed, is mounted, the well having a hole shape including a bottom surface and an inner peripheral surface;
   a suction nozzle configured to suck a solution in the well; and
   a control unit configured to control an operation of the suction nozzle and an operation of the stage, wherein
   the control unit controls the suction nozzle to perform a first suction operation for sucking the solution in the well and then move the suction nozzle away from the bottom surface, and controls the stage to rotate the stage on which the analytical unit is mounted at a predetermined speed of rotation or more so that a residue of the solution in the well is moved in the well to an outer peripheral side of the analytical unit when viewed from a rotation center of the rotation, controls the stage to stop the rotation so that a position before rotation and a position after rotation of each well become the same position, and controls the suction nozzle to move the suction nozzle closer to the bottom surface and then perform second suction operation for sucking the residue of the solution existing in the well.

2. The washing apparatus according to claim 1, wherein when performing the second suction operation, the control unit controls the stage and the suction nozzle so that a tip of the suction nozzle is positioned near the bottom surface and is positioned at a moving destination of the residue of the solution by a centrifugal force generated by the rotation.

3. The washing apparatus according to claim 1, wherein the suction nozzles are disposed in the same number as the number of the wells formed in the analytical unit, and the control unit simultaneously controls the respective suction nozzles.

4. The washing apparatus according to claim 1, further comprising
   a dispensing nozzle configured to dispense a solution into the well,
   wherein a tip of the dispensing nozzle is arranged near the inner peripheral surface of the well and closer to a center of the analytical unit than a tip of the suction nozzle,
   and wherein the control unit controls the dispensing nozzle to dispense the solution from the dispensing nozzle, when performing the first suction operation.

5. A washing method using the washing apparatus of claim 1, the method comprising:
   sucking, with the suction nozzle, a solution in the well;
   rotating the stage, by the control unit at a predetermined speed of rotation; and
   sucking, with the suction nozzle, a residue of the solution existing in the well.

\* \* \* \* \*